Sept. 16, 1969 D. H. RUMBLE 3,467,777

DATA TRANSMISSION WITH PHASE ENCODING OF BINARY STATE TRANSITIONS

Filed Oct. 15, 1965 2 Sheets-Sheet 1

INVENTOR
DALE H. RUMBLE

BY Frederick D. Poag

ATTORNEY 3,467,777
Patented Sept. 16, 1969

3,467,777

DATA TRANSMISSION WITH PHASE ENCODING OF BINARY STATE TRANSITIONS

Dale H. Rumble, Saugerties, N.Y., assignor to International Business Machines Corporation, Armonk, N.Y., a corporation of New York Filed Oct. 15, 1965, Ser. No. 496,303
Int. Cl. H04l 27/24, 15/04
U.S. Cl. 178—67 19 Claims

ABSTRACT OF THE DISCLOSURE

A data transmission system utilizes a full cycle of a waveform to encode a transition in the binary state in serial information, while steady state bits of information between transitions are represented by clock times operating at a nominal frequency having a period of half of that of the waveform. The data to be transmitted is shifted serially from a register at the nominal rate as "1" and "0" data bits. Transitions in the binary state of the bit series are detected and utilized to degate the shift control for one nominal period to produce a hesitation in the bit series. At the same time, circuitry gates out a sine waveform or a reverse sine waveform according to whether the data bit transition was from 1 to 0 or from 0 to 1. The hesitation in the bit rate provides the time for completion of this waveform, after which the sensing of new bits proceeds at the nominal rate. At the receiver, the received waveforms are sensed by correlation circuits which delay the waveform for one half its length (one nominal period), invert it and add it to the undelayed incoming signal. The transition thus detected operates gates on the receiver clock for reproducing the transmitted bit series. Error rejection in the receiver is provided by deconditioning the waveform sensing circuits for one half waveform length after each transition is detected and by rejecting any transition indication which is the same as the previously received one.

This invention relates to the transfer or transmission of digital signals, and more particularly, to modulation and demodulation by use of biphase indications of transients between one and the other of binary states of such signals, together with time lapse indication between such transitions.

In the prior art of binary signal transmission, it has been taught that it is possible to transmit information at what is, in effect, a rate which approaches twice that of the signaling rate capabilities of the transmission channel by transmitting only the information about changes from "one" to "zero," and vice-versa, in a series of binary bits of data, while letting the time lapse between such transitions convey the information of how many bits of the same kind intervene between transitions. The familiar "non-return to zero" (NRZ) system is an example of this kind of transmission technique.

In accordance with another family of transmission techniques, biphase modulation is utilized to identify each bit transmitted. In such systems, the data transmission rate may be only one bit per cycle of the modulating waveform. In practical apparatus, this yields approximately one-half bit per cycle of the bandwidth capability of the transmission channel. However, since the signal is a full wave having two distinct halves, 100% redundancy is provided, with the possibility of utilizng this redundancy for error rejection.

In accordance with the present invention, a data transfer or transmission scheme is provided whereby error rejection faculties of biphase transmssion techniques are combined with an increased average data transfer bit rate achieved by transmitting only transition information.

In accordance with one aspect of the invention, binary bits are inspected serially at a nominal rate, which rate is double the biphase operating frequency capabilities of the transmission channel over which the information is to be transferred. Whenever a transition between a "one" and a "zero" is detected, a signal wave is transmitted, such signal having a phase corresponding to the direction of the transition and a period corresponding to a frequency which is half the aforesaid nominal rate. In order to allow time for the full waveform of the biphase modulated signal to be transmitted, the inspection of new data is halted for half the period of that waveform and then resumed. Although no signals are actually transmitted between such transitions, the intelligence corresponding to the data bits between the transitions is conveyed by the time lapse between the transition indicative signals. Accordingly, the inspection and transmission is characterized by one rate at the time of transition, and double that rate between transitions. Viewed differently, two time periods of the nominal rate are provided for each transition bit while only one time period of the nominal rate is provided for non-transition bits.

In accordance with another aspect of the invention, demodulating procedures are carried out wherein, upon receipt of a biphase modulated waveform, the waveform is inspected for determining whether it is indicative of a zero-one going or one-zero going transition signal, and this information is utilized to key the output of a local clock for generating "one" or "zero" data bit signals. The local clock operates at the nominal (i.e., double frequency) rate so as to generate a series of data bits at a rate which is synchronized with that of the modulation rule above described. Moreover, since the modulation rule includes a delay or hesitation equal to one nominal period at the time of each transition, the detection of a transition in the demodulation procedure is utilized to inhibit the output of the local clock for one cycle of its (nominal) frequency, thereby adjusting the data reconstruction rate pattern to the varying rate pattern of the above described data inspection and transmission scheme.

In accordance with still another aspect of the invention, there is provided an efficient scheme of demodulating the received biphase waveform by correlation of the respective halves of the received waveforms. The received signals are delayed by one-half waveform period, either the delayed or the received waveforms are inverted, and the two resultant waveforms are added together. When the sum thus obtained exceeds a positive or negative threshold, a "one" going or "zero" going transition is indicated. Error rejection is provided by inhibiting the detector circuits for the time occupied by the final half period of the delayed waveform and by utilizing the fact that no received waveform can be meaningful unless it is of opposite phase compared to the previously received one. These employments of characteristics of the modulation-demodulation scheme combine to provide a high degree of error rejection.

The foregoing aspects of the invention apply equally to the method and apparatus teachings herein, it being understood that the apparatus to be described constitutes one preferred way of carrying out the method, in an automatic fashion. Moreover, it will be understood that while the teachings of the invention are well dapted to transmission of data over a distance, they may also be utilized within an apparatus for transferring information from one device to another.

Accordingly, a major object of the invention is to provide an improved method of transferring digital signals, in a manner which provides for both reliability and a high rate of transfer.

Another object of the invention is to provide improved apparatus for carrying out the aforedescribed method automatically.

Still another object of the invention is to provide an improved method and apparatus for modulating signals so as to yield a redundancy as to transition-significant data bits, so as to enable a high degree of reliability, while proceeding at a more rapid rate with respect to other bits.

Still another object of the invention is to provide improved methods and apparatus for demodulating a signal as aforedescribed, wherein the redundancy inherent in such a signal is utilized for error rejection, in a manner which takes advantage of the characteristics of the modulation scheme.

The foregoing and other objects, features and advantages of the invention will be apparent from the following, more particular description of preferred embodiments of the invention, as illustrated in the accompanying drawings.

Figure 1:
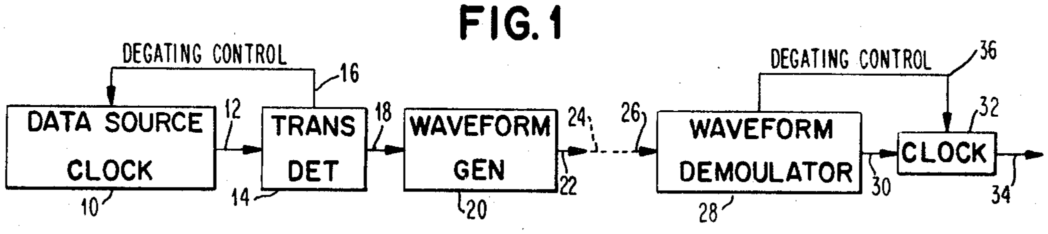
FIG. 1 is a block diagram illustrative of a data transmission system in accordance with the invention.

Referring more particularly to FIG. 1, the transmitting apparatus of the invention may include a data source and clock 10 which is operative to yield a seires of binary coded data bits at its output 12 at a rate determined by the clock, herein referred to as the "nominal" or "double frequency" rate. The output at 12 is examined in a transition detector apparatus 14 for changes from "1" to "0" or vice-versa in the series of binary bits of data. Whenever such a transition occurs, the apparatus 14 emits a degating signal on one of its outputs 16 which is operative to halt the clocking out of data from the apparatus 10 for one period of the nominal rate. At the same time, on another output 18 of the transition detector 14 there is emitted a signal which activates a waveform generator 20 to emit a signal at its output 22, which is a single biphase modulated waveform in accordance with the direction of the transition detected. This signal is then transmitted via any suitable medium 24 such as wire, cable, microwave link or the like to the receiving station, at the input 26 of which it is fed to a waveform demodulator 28 in accordance with the invention.

The demodulator apparatus 28 is operative to sense the occurrence of the signal and thereupon emit a control signal at its output 30 for keying the operation of an oscillator or other suitable local clock pulse source 32. This control signal alters the operation of the source 32 so as to yield at its output 34 data bits of a character corresponding to the binary state commensurate with the newly detected transition. For correctly regulating the number of such bits in the series at the output 34, one bit is omitted from the otherwise continuous series of bits in the output 34 whenever a transition occurs. In the block diagram, this function is shown by the degating control 36 which is responsive to the waveform demodulator 28 to inhibit the output of the clock 32 for one cycle thereof by and upon the detection of a transition by the demodulator apparatus 28.

Figure 2:
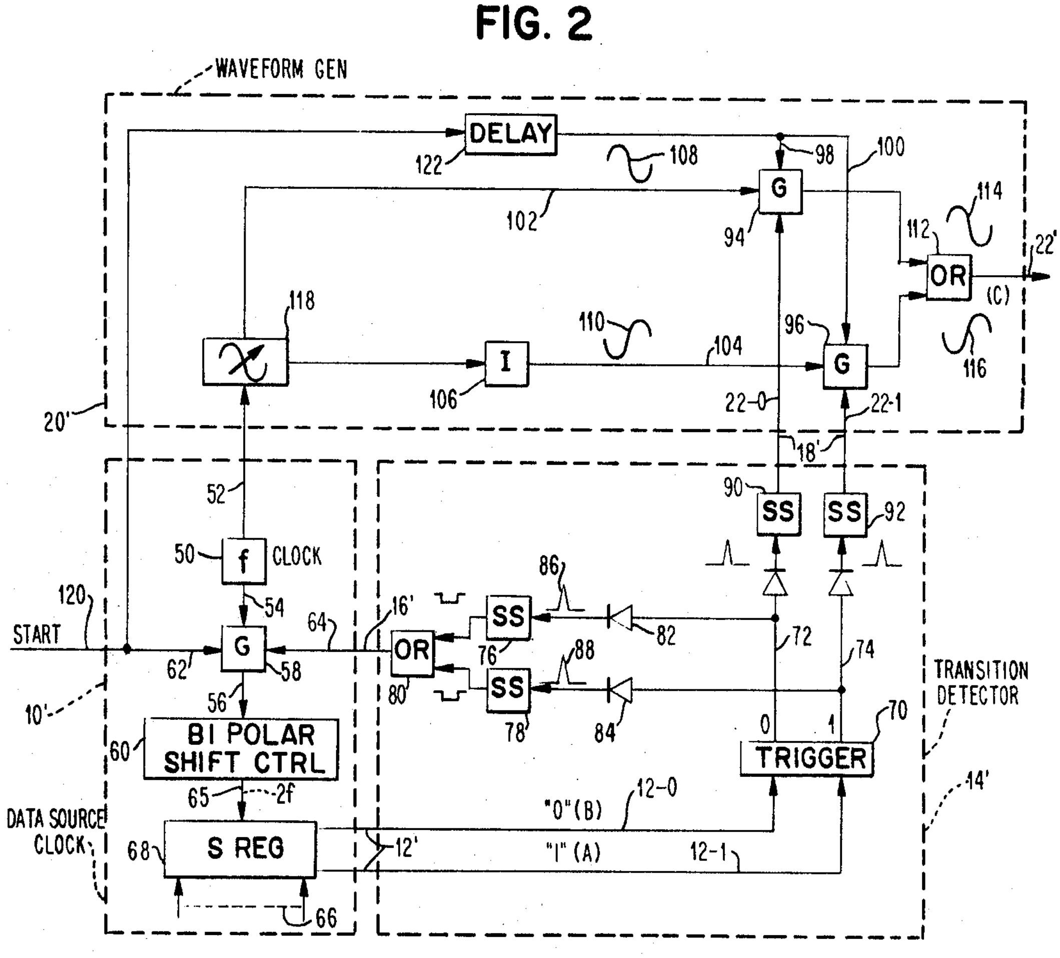
FIG. 2 is a schematic diagram of circuitry suitable for use in the transmitting or modulating portions of the system of FIG. 1.
Figure 3:
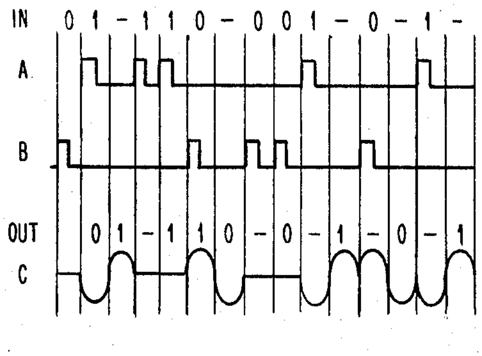
FIG. 3 is a data pulse and waveform diagram illustrative of the operation of the circuits of FIG. 2.
Figure 4:
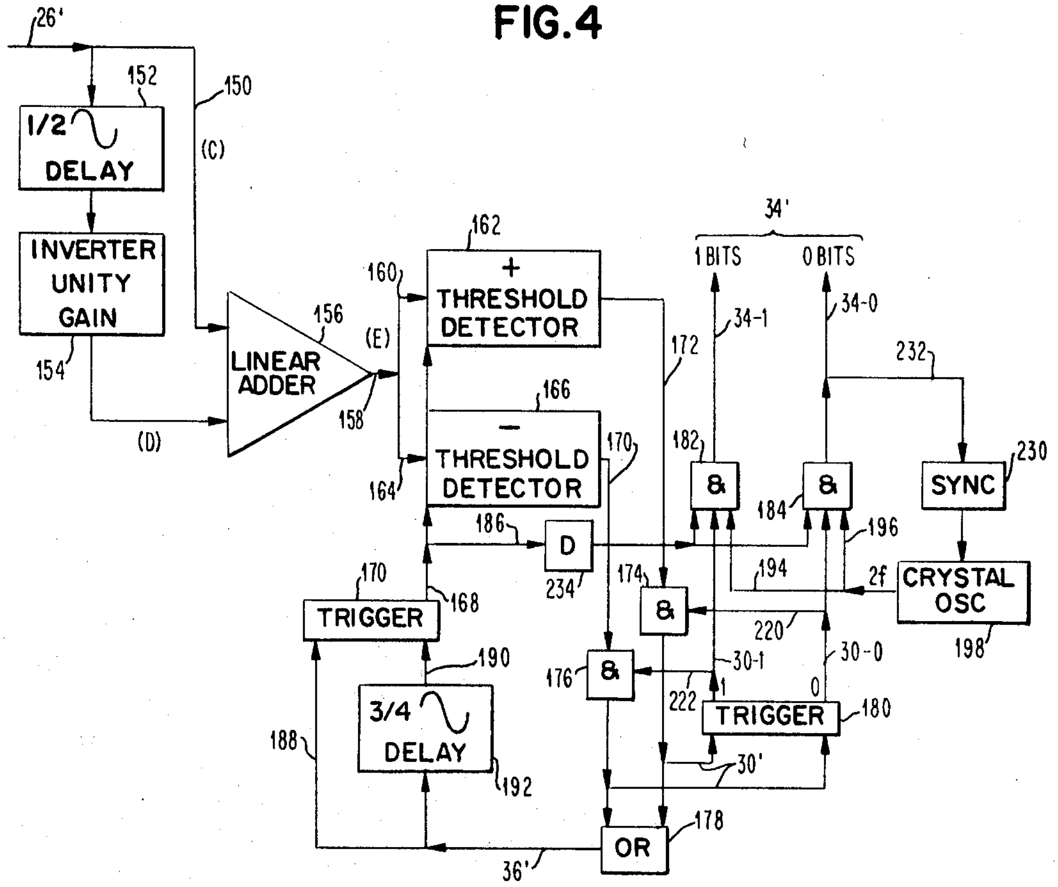
FIG. 4 is a schematic diagram of circuits suitable for use in the demodulating or receiving portions of the system of FIG. 1.
Figure 5:
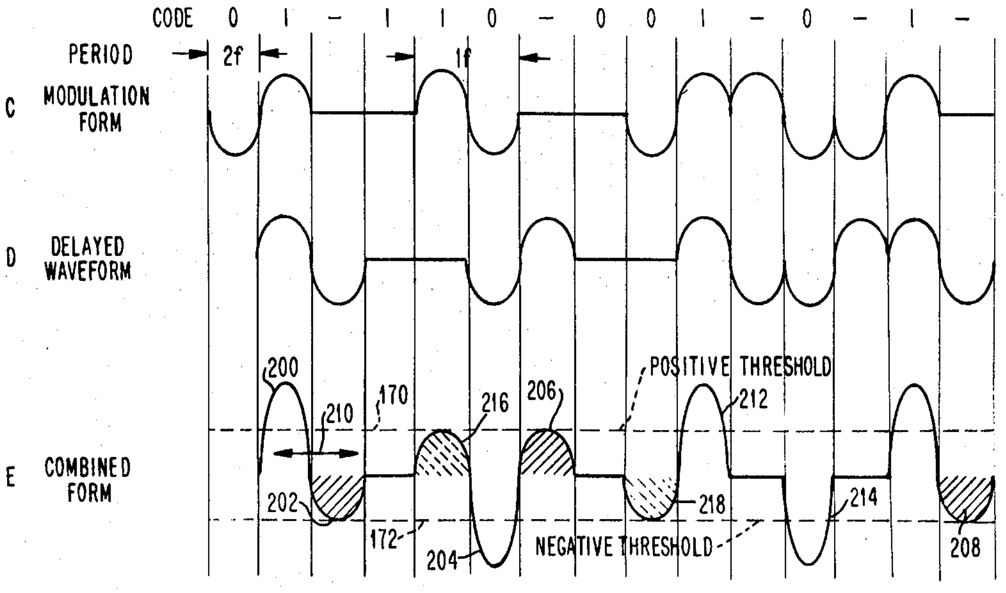
FIG. 5 is a waveform diagram illustrative of the operation of the circuits of FIG. 4.

The operation of FIG. 1 as aforedescribed will be understood in greater detail by examination of FIGS. 2 and 4 together with the diagrams of FIGS. 3 and 5 corresponding thereto. In FIG. 2, one preferred embodiment of the transmitting apparatus in accordance with the organization of FIG. 1 is shown. In this figure, parts having general correspondence to those of FIG. 1 are given the same reference number with a prime (′) added.

Thus, the data source and clock 10′ facility of the apparatus of FIG. 2 may comprise an oscillator or like timing device 50 having dual outputs, on lines 52 and 54, each comprising a full wave output at frequency $f$. One of the outputs, on line 54, serves as a bipolar clock signal and is fed via the output 56 of an analog gate 58 to a bipolar shift control 60. The gate 58 has two logical input controls 62, 64, both of which must be "up" to pass the clock signal. As will be explained more fully hereinafter, the input on line 62 is normally "up" during operation of the apparatus, while the input on line 64 is shifted to its "down" level to degate the signal from the clock whenever such a command is received on line 16′, corresponding to line 16 in FIG. 1.

Any suitable circuit can be used for the gate 58, and it will be understood that in practice the inputs 62, 64 may be fed to a logical "and" circuit and then the output of this circuit utilized to operate a simple linear analog gate for controlling the flow of clock pulses from element 50 to element 60, the present rather condensed showing of FIG. 2 being utilized for clarity of illustration.

The output of the bipolar shift control on line 65 has a pulse rate of $2f$, which is the aforesaid "nominal" rate of data transmission. The data to be transmitted may derive from a tape, disk, core storage array or any other suitable source, and is indicated for purposes of illustration to have been loaded via inputs 66 into a shift register 68 from which the data is shifted, one bit at a time, under the control of timing input line 65 thereof. The output of the shift register 68 on line pair 12′ corresponds to the output on line 12 of FIG. 1 and consists of a pulse on line 12–0 wherever a "0" bit has been shifted from the register 68 and a pulse on line 12–1 whenever a "1" bit has been shifted from the register.

These signals are operative to switch a trigger 70 (such as a bistable multivibrator) between its "1" and "0" states so as to bring up levels on lines 72 and 74 whenever a "0" or "1," respectively, is shifted from register 68, the binary state of these levels being maintained by the trigger 70 between switching operations thereof. Each change of the state of the trigger 70 is therefore indicative of a transition in the binary state of the output of the register 68, with the sense of the switching of the trigger corresponding to the sense of the transition.

The trigger output on lines 72 and 74 is fed to corresponding time-out or "single shot" circuits 76, 78, the outputs of which are OR'd by a circuit 80 for producing the degating signal on line 16′ desired by and upon the occurrence of each data state transition in the register 68 output. The single shot circuits 76, 78 may be monostable multivibrators, and to indicate the logical significance of their inputs from lines 72, 74, diode and positive going pulse symbols 82, 84 and 86, 88 have been shown. These symbols indicate that the single circuits 76, 78 are responsive only to positive going transients of the outputs of trigger 70. Of course, other logical organizations could be employed, the object being to provide a degating signal on line 16′ having a duration of one-half the period of clock 50, or, in other words, one period of the nominal rate signal on line 65.

The trigger level outputs on lines 72, 74 are fed also to the inputs of single shots 90, 92 which are also, as indicated by the diode and pulse signals at the inputs thereof, responsive to positive going transients of the trigger 70 output. Thus, the operation of the single shots 90, 92 is like that of the aforedescribed degating single shots 76, 78, except that the single shots 90, 92 perform a gating signal function and are set to time out in one period of the clock 50. In other words, they provide, upon activation by a positive-going transient on lines 72 or 74, a corresponding "up" output level for one full $1f$ period. This output from one or the other of the single shots 90, 92 is transmitted via line pair 18′ corresponding to line 18 in FIG. 1 to the "waveform generator" 20′. Thus, an "up" signal exists on line 22–0 when a "1–0" going transition has been detected, while such a signal appearing on line 22–1 indicates that a "0–1" going transient has been detected. These outputs are fed to corresponding analog gates 94, 96 as a logical input thereto. The other logical input, which must also be "up" to condition the corresponding gates is supplied via lines 98 and 100. It will be observed that this is the same arrangement as aforedescribed with respect to analog gate 58 and may be carried into effect in actual practice in the same manner.

The analog inputs to the gates 94, 96 are supplied on lines 102, 104, the line 104 having an inverter circuit 106 interposed therein so that the signals on the two lines as fed to the gates are of opposite phase, as indicated by the symbols 108, 110. Although these waves could be of any (preferably symmetrical) periodic shape, they are referred to hereinafter as the "sine" and "reverse-sine" waveforms respectively. The output of the two analog gates 94, 96 are fed to a linear "OR" 112, so that the output on the line 22′ thereof may be a sine waveform 114 or a reverse-sine waveform 116 according to which of the gates 94 or 96 has been fully conditioned. This, then, corresponds to the output 22 in FIG. 1, and consists of a single sine or reverse-sine waveform, respectively, whenever a "1–0" going or "0–1" going data bit transition occurs at the output of the register 68. In actual practice, some means may be provided to allow for phase shifts resulting from the operation of the several circuits and also, to prevent the transmission of spurious signals during start-up. In the illustrated circuit, the signals on lines 102, 104 are continuous sinusoidal wave trains derived from the output 52 of the clock 50, via a suitable phase shift control 118 which is adjustable to offset the delays in the logical circuit elements. One large such delay may be in the response of the bipolar shift control 60 to a sinusoidal output from the clock 50. Also, of course, the time-out period of single shots 76, 78 is actually made somewhat more than one "nominal" period, by a tolerance sufficient to insure its proper functioning in inhibiting exactly one pulse on line 65.

Moreover, a "start" circuit 120 having a delay 122 is included by way of illustration to indicate conventional means to postpone bringing up of the conditioning inputs 98 and 100 of gates 94, 96 until after transmitter internal start up procedures have been completed. It will be understood that in actual, start-up circuits may be considerably more elaborate and may be related, for example, to those control circuits which initiate the loading of the data via lines 66 into the shift register 68.

The operation of the circuitry of FIG. 2 may be summarized with reference to the wave form timing diagram of FIG. 3. Let it be assumed that during a time segment under observation (time proceeding to the right in the diagram) the data to be shifted from register 68 is (reading left to right) "0111000101." These binary bits are shown in the data "IN" line at the top of the diagram. It will be observed that, in the diagram, a space (–) is provided after each bit which is different from the preceeding bit. This space is provided by operation of the degating signal on line 16′ in FIG. 2. Whenever a "0" is shifted out of the register 68, a pulse is seen on line 12–0, as indicated at line B in the diagram, while whenever a "1" is emitted from the register a pulse is seen on line 12–1, as indicated in line A of the diagram.

These pulses switch trigger 70 one way or the other whenever an A pulse follows a B pulse, or vice-versa, thereby giving rise to a positive going transient on one or the other of the outputs of the trigger. This activates one or the other of the single shots 76, 78 which produce the degating signal on line 16′. In the diagram it is assumed that the bits prior to the time segment shown were zeroes so that the first such degated period is seen in the third time period of the diagram when the "0–1" transition between the first two time periods has its effect. At the same time, as soon as this transient is detected, at the beginning of the second time period, the corresponding single shot 92 begins timing the transmission of a waveform of the appropriate phase, in this case a reverse-sine waveform as shown in curve "C" of the diagram.

The next transition is, of course, the transition from "1" to "0" between the fifth and sixth periods of the diagram. The pulse in line B in the sixth time period initiates a degating action on line 16′ resulting in the halting of the shfting of the register 68 for the seventh time period and the gating out of a sine waveform, indicative of the "1–0" shift, in the sixth and seventh time periods.

The time periods shown on the diagram are ones corresponding to the 2*f* or nominal rate. It will be seen that in the fourth and fifth periods when there is no change of bit significance and continuing through the sixth period when the change commencing therein has not yet produced a degating signal on line 16′, the bit rate at which data is shifted from the register 68 corresponds to the 2*f* or nominal frequency. It will be further seen that each transition is marked by the transmission of a biphase modulated waveform which occupies two time periods or, in other words, is at the "1*f*" rate. The data significance of these waveforms is shown in the "OUT" line with a shift of one nominal period in time from the "IN" line. This notation is used in the preferred demodulating scheme, to be described, since it is at the time of the second half of each such wave that its phase significance is determined.

Turning now to FIG. 4, a preferred demodulating or receiver arrangement in accordance with the invention is shown. This arrangement incorporates not only a degating control such as indicated at 36 in FIG. 1, which provides the desired synchronization with the mixed frequency operation of the transmtiter, but also provides the certain error rejection features of the invention. Accordingly, it should be understood that not all of the features nor the specific circuitry of FIG. 4 are necessary to employment of the invention. However, the figure is illustrative of one preferred circuit arrangement and aids in the understanding of the demodulating scheme of FIG. 1. In order to make the figure more compact, the circuit of FIG. 4 has not been divided into boxes which are the literal equivalents of the elements 28, 32 of FIG. 1. However, the circuit of FIG. 4 performs the same functions, and includes a line pair 30′ which conveys the demodulated data information similarly to the line 30 in FIG. 1, and a line 36′ which carries the signal initiating the degating control corresponding to the line 36 in FIG. 1.

In accordance with the scheme of FIG. 4, the signal received on input line 26′ (corresponding to line 26 in FIG. 1) is fed directly by line 150, and through a half cycle delay 152 and an inverter 154, to the corresponding inputs of a linear adder 156. These inputs are shown at C and D respectively in FIG. 5, and their sum at the output 158 of the adder is shown at E. The curve F of FIG. 5 also shows certain cross-hatched areas which relate to error rejection and will be explained hereinafter.

The output E of the adder is fed as shown to the gated input 160 of a positive threshold detector 162 and to the gated input 164 of a negative threshold detector 166. The conditioning input to these detectors is fed by a line 168 which is maintained in normally "up" condition by a trigger 170. The threshold detectors 162, 166 may be of any customary or appropriate kind, and are adjusted to have positive and negative respective thresholds of detection as shown at 170, 172 in FIG. 5. The threshold detectors 162, 166 are fed through logical AND (&) circuits 174, 176, to a logical OR circuit 178 and also via a line pair 30′ to a trigger 180. The outputs of the trigger on lines 30–1 and 30–0 constitute levels indicative of the current binary state of the information being received; in other words whether the last transition was from "0" to "1" or from "1" to "0," respectively. These outputs are fed to logical AND circuits 182, 184 as one of the respective conditioning inputs thereto.

Another input to each of the AND circuits 182, 184 is supplied via lines 186 and 168 from trigger 170. The level on this line is normally "up," but when it is "down" it becomes a degating signal operative to decondition both of the AND circuits 182 and 184. This condition obtains for about three-fourths of a cycle of the input waveform frequency (in other words, for about 1.5 cycles of the "nonminal" frequency) after each detection of a signal by one of the threshold circuits 162, 166. This is one of the functions of the trigger 170, and is accomplished by connecting an input of that trigger, via a line 188 and line 36', to be energized by the output of OR circuit 178. An output pulse from OR circuit 178 switches the trigger 170 in a manner to drop the level on its output line 168. Then, the operative level of line 168 and 186 is restored by operation of the other input 190 through a delay 192 of the desired value.

The final input to each of the AND circuits 182, 184 is provided via lines 194, 196 from a pulse train source 198. The operative frequency of this pulse train is the "nominal" or $2f$ frequency of the apparatus so that whenever one or the other of the AND circuits 182, 184 is otherwise conditioned, the pulse train delivered to lines 194, 196 is gated through to one or the other of the output lines 34–1 or 34–0 of the apparatus. These lines together form a line pair 34' corresponding to line 34 of FIG. 1, and provide an output which is a reconstruction of the original input as seen in lines A and B of FIG. 3.

Means are provided to take advantage of the redundancy inherent in biphase modulation, and also the fact that in the present system no transition indication during continuous transmission conditions can be valid unless it is opposite from the last one, to provide a high degree of error rejection. Referring to curve E of FIG. 5 it will be seen that each validly significant interception of one of the detector thresholds 170, 172 is followed by an excursion, corresponding to the second half of the delayed waveform, into near approach to the opposite threshold of detection. For example, excursion 200 is followed by excursion 202, significant excursion 204 is followed by nonsignificant excursion 206, etc.

The significant excursions 200, 204, and so on, are characterized by high reliability, since they are made up of the addition of the waveforms of curves C and D in the corresponding time periods in such manner as to provide good gaussian noise rejection. However, the nonsignificant excursions 202, 206 and so on which follow them are detrimental because they form sites for possible addition with noise to cause a spurious threshold indication. The avoidance of this is a second function of the trigger 170. The output 168 of that trigger serves also as the conditioning input of the threshold detectors 162, 166, as indicated in the drawing. Thus, during the time-out period provided by the delay 192, the threshold detectors are insensitive to signals and this insensitivity is indicated in curve E by the solid cross-hatching within the excursions 202, 206, and 208. It will be seen that the delay 192 is not extremely critical because, as indicated at 210, a time of three-quarters of a cycle of the waveform easily embraces both peaks thereof. An upper limit of this time-out period is provided by the case exemplified by significant excursions 212 and 214. Here, if the time-out period initiated by detection of excursion 212 were too long, it might prevent detection of significant excursion 214.

Nonsignificant excursions also precede some of the significant ones. These excursions are caused by the first half of the undelayed incoming waveform such as shown, for example, at 216 and 218. These can be detected and suppressed by the rule that, in a continuous transmission, they could not be valid because they follow a previously detected valid transition marked by excursion 200 or 204, respectively. Advantage is taken of this fact by including AND circuits 174, 176 in the receiver circuitry of FIG. 4. AND circuit 174 is placed in the "1" going output line 172 of threshold detector 162, and is conditioned via a line 220 leading from the "0" output of trigger 180. Conversely, AND circuit 176 is placed in output line 170 of the "0" going threshold detector 166 and is placed, via line 222, under the conditioning control of the "1" output side of trigger 180. Accordingly, "1" going transition signals on line 172 can pass AND circuit 174 only if trigger 180 is already in its "0" state, and "0" going transition signals on line 170 can pass AND circuit 176 only when trigger 180 is already in its "1" state. Returning to FIG. 5, curve E, it will be seen that, should excursion 216 cause a spurious signal on line 172 of FIG. 4, such signal will be blocked by AND circuit 174, and any such signal resulting on line 170 as a result of excursion 218 will be blocked by AND circuit 176.

The foregoing discussions have been made with respect to a block of time chosen arbitrarily from a position within a hypothetical continuous data transmission. No particular data format rule need be observed for such a transmission if the receiver clock is known to be in perfect synchronization with the transmitter clock 50. In the illustrated circuit of FIG. 4 the receiver clock 198 is driven by a crystal oscillator which is kept in synchronism by a suitable circuit 230 fed by a connection 232 from, arbitrarily, the "0" output of the apparatus. Normally, sufficient zeroes will occur in any regular transmission to insure proper synchronization of the receiver clock but, if desired, a rule which requires that zeroes occur every so often can be enforced. For start-up operations, any suitable means can be provided for insuring that trigger 70 of FIG. 2 and triggers 170 and 180 are initially in a preset condition. For example, these triggers can be provided in known manner with internal circuitry which brings them to a preset set when power is turned on from an off condition. If this state is the "1" state for triggers 70 and 180 and the normal (output 168 up) state of trigger 170, an initial transmission of a "0" will appear to be a "0"-going transition setting the entire apparatus in operation and serving to provide an initial synchronization signal through circuit 230 to the receiver clock.

Of course, other known start-up techniques of the data processing and data transmission arts can be utilized as desired. Also, it will be understood that although positive logic has been assumed throughout, the invention is not limited to any particular logic family. Similarly, more complicated threshold detection circuits (e.g., combined slope and amplitude) and/or nonsinusoidal waveforms may be used, and delay 192 adjusted accordingly.

OR circuit 178 produces some delay which allows trigger 180 to switch somewhat in advance of trigger 170. However, a delay 234 of, for example about one-half of the nominal $2f$ period can be inserted in line 186, if desired to guard against slivering of outputs of AND circuits 182, 184. This will shift the degating signal 210 as it applies to those circuits so as to be in more perfect synchronism with the clock 32 output pulse to be blanked while avoiding any unwanted degating of the preceding output pulse. Alternatively, these timing problems could be simplified by generating the degating signal on line 186 without direct reference to the operation of trigger 170, for example, by use of a delay and a single shot (not shown) energized directly from line 36'.

Moreover, certain of the features of the invention as taught herein can be utilized advantageously without certain others of the invention. For example, other demodulation schemes could be utilized, but the one shown has the particular advantage of making favorable use of certain characteristics of the transmitted signal. Moreover, the medium 24 could include storage, such as a tape, disk or drum unit in a system wherein the invention is used to increase the effective bit density of the storage. Thus, while the invention has been particularly shown and described with reference to preferred embodiments of various aspects thereof, it will be understood by those skilled in the art that various changes in form and detail may be made therein without departing from the spirit and scope of the invention.

What is claimed is:

1. In the transferring of serial digital information from one apparatus to another;
the method of modulating a signal in accordance with said information, comprising,
encoding said bits at a nominal rate by detecting transitions in said information and transmitting a modulated waveform indicative of the timing and character of each such transition, said waveform having a period corresponding to a frequency of less than said nominal rate, and
suspending said encoding of new bits after the detection of each such transition to allow time for completion of said waveform,
and the method of demodulating such transmission including the steps of
deriving an indication of the occurrence and character of a transition from a received waveform, and
using the transition indications to control the provision of series of indications of bits of information of a corresponding character, each of which series includes only one bit during the time corresponding to said waveform period but continues after that time with like bits, if any, at said nominal rate.

2. In the transferring of serial binary information from one apparatus to another.
the method of modulating a signal in accordance with said information, comprising,
establishing a nominal rate of transmission of successive bits of said information,
encoding said bits at said nominal rate by detecting transitions from one binary state to the other in the bit series and transmitting a biphase modulated waveform indicative of the timing and sense of each such transition, said waveform having a period corresponding to a frequency of half said nominal rate, and
suspending said encoding of new bits for a half a period of said waveform after the detection of each such transition to allow time for completion of said waveform,
and the method of demodulating such transmission including the steps of
correlating the first and second halves of each transition waveform,
providing an indication of a transition of one sense or the other when such correlation provides a detection of one phase or the other, respectively, in said biphase modulated waveform, and
using the transition indications to control the provision of series of indications of binary bits of one or the other corresponding state, each of which series includes only one bit during a time equal to said waveform period after the detected transition but continues after that time with like bits, if any, at said nominal rate.

3. The method of claim 2, wherein, in said method of demodulating,
said correlating of the first and second halves of each transition waveform accomplished by adding said halves together in the same sense,
said indication of a transition is provided when such correlation provides a total exceeding a predetermined threshold of one polarity or the other with respect to a datum,
and the provision of transition indications is modified by inhibiting both such transition indications for a time interval after each uninhibited indication sufficient that the total resultant from such correlation has decreased to a level below the threshold in the half waveform period following that in which the indication occurred.

4. The method of claim 2, wherein, in said method of demodulating,
said correlating of the first and second halves of each transition waveform is accomplished by adding said halves together in the same sense,
said indication of a transition is provided when such correlation provides a total exceeding a predetermined threshold of one polarity or the other with respect to a datum,
and the provision of transition indications is modified by further inhibiting any transition indication which is of the same sense as the previous uninhibited transition indication.

5. The method of claim 2, wherein, in said method of demodulating,
said correlating of the first and second halves of each transition waveform is accomplished by adding said halves together in the same sense,
said indication of a transition is provided when such correlation provides a total exceeding a predetermined threshold of one polarity or the other with respect to a datum,
and the provision of transition indications is modified by
inhibiting both such transition indications for a time interval after each uninhibited indication sufficient that the total resultant from such correlation has decreased to a level below the threshold in the half waveform period following that in which the indication occurred, and
further inhibiting any transition indication which is of the same sense as the previous uninhibited transition indication.

6. In the transferring of serial binary information from one apparatus to another;
the method of modulating a signal in accordance with said information, comprising,
establishing a nominal rate of transmission of successive bits of said information,
encoding said bits at said nominal rate by detecting transitions from one binary state to the other in the bit series, and
transmitting a biphase modulated waveform indicative of the timing and sense of each such transition, said waveform having a period corresponding to a frequency of half said nominal rate, and
suspending said encoding of new bits for a half a period of said waveform after detection of each such transition to allow time for completion of said waveform.

7. In the receiving of serial binary information at one apparatus from another wherein the information has been encoded by the provision of a biphase modulated waveform indicative of each bit significance transition in the binary series, each transition being represented by a waveform of a first period and the time positions of intervening bits being represented by time spaces having a nominal period which is half that of said waveform,
the method of demodulating such transmission includin the steps of
correlating the first and second halves of each transition waveform,
providing an indication of a transition of one sense or the other whenever such correlation provides a detection of one phase or the other, respectively, in said biphase modulated waveform, and
using the transition indications to control the provision of series of indications of binary bits of one or the other corresponding state, each of which series includes only one bit during a time equal to said waveform period after the detected transition but continues after that time with like bits, if any, at the nominal rate corresponding to said intervening bit time spaces.

8. The method of claim 7 wherein,
said correlating of the first and second halves of each transition waveform is accomplished by adding said halves together in the same sense,
said indication of a transition is provided when such correlation provides a total exceeding a predetermined threshold of one polarity or the other with respect to a datum,
and the provision of transition indications is modified by
inhibiting both such transition indications for a time interval after each uninhibited indication sufficient that the total resultant from such correlation has decreased to a level below the threshold in the half waveform period following that in which the indication occurred.

9. The method of claim 7, wherein
said correlating of the first and second halves of each transition waveform is accomplished by adding said halves together in the same sense,
said indication of a transition is provided when such correlation provides a total exceeding a predetermined threshold of one polarity or the other with respect to a datum,
and the provision of transition indications is modified by
further inhibiting any transition indication which is of the same sense as the previous uninhibited transition indication.

10. The method of claim 7, wherein
said correlating of the first and second halves of each transition waveform is accomplished by adding said halves together in the same sense,
said indication of a transition is provided when such correlation provides a total exceeding a predetermined threshold of one polarity or the other with respect to a datum,
and the provision of transition indications is modified by
inhibiting both such transition indications for a time interval after each uninhibited indication sufficient that the total resultant from such correlation has decreased to a level below the threshold in the half waveform period following that in which the indication occurred, and
further inhibiting any transition indication which is of the same sense as the previous uninhibited transition indication.

11. Means for modulating a signal in accordance with transitions in serial digital information, comprising
means for sensing the state of bits of said information at a nominal rate,
bit state transition detector means responsive to said sensing means,
wave source means responsive to said transition detector means operative to provide a cycle of a waveform by and upon detection of each said transition, said waveform being of a character indicative of the sense of said transition and having a period corresponding to less than said nominal rate, and
control means responsive to said detector means operative to arrest operation of said sensing means by and upon detection of each transition to compensate for the difference between the period of said waveform and that of said nominal sensing rate.

12. Means for biphase modulating a signal in accordance with transitions in serial digital information comprising,
means for sensing the state of successive bits of said information at a nominal rate,
bit state transition detector means responsive to said sensing means,
wave source means responsive to said transition detector means operative to provide a cycle of a waveform by and upon detection of each said transition, said waveform being of a phase indicative of the sense of said transition and having a period corresponding to half said nominal rate, and
control means responsive to said detector means operative to arrest operation of said sensing means for one period of said nominal rate by and upon detection of each transition.

13. Means for biphase modulating a signal in accordance with transitions in serial binary information, comprising
means for sensing the state of bits of said information at a nominal rate,
bit state transition detector means responsive to said sensing means,
sinusoid source means responsive to said transition detector means operative to provide a cycle of a waveform by and upon detection of each said transition,
said waveform being of phase modulated between sinusoidal and reverse sinusoidal form according to the sense of said transition and having a period corresponding to half said nominal rate, and
control means responsive to said detector means operative to arrest operation of said sensing means for one period of said nominal rate by and upon detection of each transition.

14. Apparatus according to claim 13, wherein
said sensing means includes means for sampling said bits in succession and storage means for registering the state thereof,
said source means comprises complementary output channels for one and the other of the sine and reverse sine waves, and a synchronizing connection to said sensing means operative through said control means, and
said detector means comprises first and second timing means sensitive to changes in the state of said storage means, said first timing means being operative to gate a waveform selectively from one or the other of said channels of said source means and said second timing means being connected to said control for initiating said arrest operation thereof.

15. Means for demodulating a signal which is waveform modulated in accordance with transitions in serial digital information comprising
means for detecting the occurrence and character of said waveform,
output signal pulse means operative at a nominal pulse rate having a period of less than that of said waveform,
means for gating signals from said pulse means under the control of said detecting means to produce an output, and
means for inhibiting said output gating means for a time, corresponding to the difference between the period of said waveform and that of said nominal rate, after a transition is detected,
whereby said demodulation means provides a nominal output rate of bits of information when there is no transition in the said information state and a lower output rate of information when there is a transition in said information.

16. Means for demodulating a biphase sinusoidal signal which is waveform modulated in accordance with transitions in serial digital information comprising:
means for detecting the occurrence and phase of said waveform,
output signal clock means operative at a nominal pulse rate having a period of half that of said waveform,
means for gating signals from said clock means under the control of said detecting means to produce a binary output at said pulse rate, and
means for inhibiting said output gating means for a time equal to one period of said nominal rate after a waveform is detected, whereby said demodulation means operates at an output rate of two binary bits of information being demodulated per cycle of said sinusoid when there is no transition in the said binary information state and one bit of binary information demodulated per cycle of said sinusoid when there is a transition in said binary information state.

17. Apparatus in accordance with claim 16, wherein said detecting means comprises:

means for correlating the first and second halves of said waveform to form a composite signal having relatively inverted and half-wave overlapped components derived from said waveform, and means for sensing relatively positive and negative excursions of said composite signal which exceed predetermined positive and negative threshhold levels, and wherein said apparatus also includes means for disabling said detecting means and said gating means for a predetermined time after a transition is detected.

18. Apparatus in accordance with claim 16, wherein said detecting means comprises:

means for correlating the first and second halves of said waveform to form a composite signal having relatively inverted and half-wave overlapped components derived from said waveform, and means for sensing relatively positive and negative excursions of said composite signal which exceed predetermined positive and negative threshhold levels, and wherein said apparatus also includes storage means responsive to said detecting means and connected to inhibit the output of said detecting means when the output thereof is of the same binary sense as the preceding uninhibited output thereof.

means for disabling said detecting means and said gating means for a predetermined time after a transition is detected, and means for synchronizing said output clock means with the detected binary information.

19. In a system for transferring serial digital information from one apparatus to another, signal transmitter means for modulating a signal in accordance with transitions in said information, comprising, means for sensing the state of bits of said information at a nominal rate, bit state transition detector means responsive to said sensing means, wave source means responsive to said transition detector means operative to provide a cycle of a waveform by and upon detetcion of each said transition, said waveform being of a character indicative of the sense of said transition and having a period corresponding to less than said nominal rate, and control means responsive to said detector means operative to arrest operation of said sensing means by and upon detection of each transition to compensate for the difference between the period of said waveform and that of said nominal sensing rate;

and signal receiver means responsive to said transmitter means, comprising means for detecting the occurrence and character of said waveform, output signal pulse means operative at said nominal pulse rate, means for gating signals from said pulse means under the control of said detecting means to produce an output, and means for inhibiting said output gating means for a time, corresponding to the difference between the period of said waveform and that of said nominal rate, after a transition is detected, whereby said receiver means provides a nominal output rate of bits of information when there is no transition in the said information state and a lower output rate of information when there is a transition in said information, in correspondence with the operation of said sensing means in the transmitter.

References Cited

UNITED STATES PATENTS

| | | | |
|---|---|---|---|
| 2,991,452 | 7/1961 | Welsh | 340—167 X |
| 3,032,745 | 5/1962 | Hamer | 178—68 X |
| 3,244,986 | 4/1966 | Rumble | 178—88 X |
| 3,349,328 | 10/1967 | Hunkins et al. | 178—67 X |

ROBERT L. GRIFFIN, Primary Examiner

U.S. Cl. X.R.

178—68; 325—30, 38

UNITED STATES PATENT OFFICE
CERTIFICATE OF CORRECTION

Patent No. 3,467,777 September 16, 1969

Dale H. Rumble

It is certified that error appears in the above identified patent and that said Letters Patent are hereby corrected as shown below:

In the heading to the drawings, Sheets 1 and 2, and in Column 1, lines 2 and 3, "DATA TRANSMISSION WITH PHASE ENCODING OF BINARY STATE TRANSITIONS" should read -- DIGITAL INFORMATION TRANSMISSION AT VARYING BIT RATE WITH MODULATED WAVEFORM ENCODING OF INFORMATION TRANSITIONS --. Column 2, line 65, "dapted" should read -- adapted --. Column 4, line 57, after "single" insert -- shot --. Column 5, line 49, after "actual" insert -- practice --. Column 6, line 37, "transmtiter" should read -- transmitter --. Column 8, line 10, delete "is". Column 9, line 10, delete "said"; line 10, after "bits" insert -- of said information --; line 63, after "waveform" insert -- is --. Column 10, line 48, after "after" insert -- the --. Column 14, line 5, "detetcion" should read -- detection --.

Signed and sealed this 24th day of November 1970.

(SEAL)
Attest:

EDWARD M.FLETCHER,JR.
Attesting Officer

WILLIAM E. SCHUYLER, JR.
Commissioner of Patents